(12) United States Patent
Dowe et al.

(10) Patent No.: US 7,579,058 B2
(45) Date of Patent: Aug. 25, 2009

(54) AIR BRAKE LINE

(75) Inventors: Andreas Dowe, Borken (DE); Michael Boeer, Olfen (DE); Karl Kuhmann, Duelmen (DE); Guido-Jan Schmitz, Duelmen (DE)

(73) Assignee: Degussa GmbH, Duesseldorf (DE)

( * ) Notice: Subject to any disclaimer, the term of this patent is extended or adjusted under 35 U.S.C. 154(b) by 0 days.

(21) Appl. No.: 11/685,283

(22) Filed: Mar. 13, 2007

(65) Prior Publication Data

US 2007/0231520 A1    Oct. 4, 2007

(30) Foreign Application Priority Data

Mar. 14, 2006    (DE) ................ 10 2006 011 493

(51) Int. Cl.
*F16L 11/04* (2006.01)
(52) U.S. Cl. ............ 428/36.91; 428/34.1; 428/35.7; 428/36.6; 428/36.7; 428/36.9; 138/137
(58) Field of Classification Search ............ 428/34.1, 428/35.7, 36.6, 36.7, 36.8, 36.9, 36.91; 138/118, 138/137, 140, 141
See application file for complete search history.

(56) References Cited

U.S. PATENT DOCUMENTS

| | | | |
|---|---|---|---|
| 5,167,259 A | 12/1992 | Brunnhofer | |
| 5,313,987 A | 5/1994 | Rober et al. | |
| 5,404,915 A | 4/1995 | Mugge et al. | |
| 5,500,263 A | 3/1996 | Rober et al. | |
| 5,512,342 A | 4/1996 | Rober et al. | |
| 5,554,426 A | 9/1996 | Rober et al. | |
| 5,706,864 A * | 1/1998 | Pfleger | 138/121 |
| 5,798,048 A | 8/1998 | Ries | |
| 5,858,492 A | 1/1999 | Roeber et al. | |
| 6,066,377 A * | 5/2000 | Tonyali et al. | 428/36.3 |
| 6,090,459 A | 7/2000 | Jadamus et al. | |
| 6,161,879 A | 12/2000 | Ries et al. | |
| 6,335,101 B1 | 1/2002 | Haeger et al. | |
| 6,355,358 B1 | 3/2002 | Boer et al. | |
| 6,391,982 B1 | 5/2002 | Haeger et al. | |
| 6,407,182 B1 | 6/2002 | Maul et al. | |
| 6,428,866 B1 | 8/2002 | Jadamus et al. | |
| 6,451,395 B1 | 9/2002 | Ries et al. | |
| 6,528,137 B2 | 3/2003 | Franosch et al. | |
| 6,538,073 B1 | 3/2003 | Oenbrink et al. | |
| 6,555,243 B2 * | 4/2003 | Flepp et al. | 428/474.4 |
| 6,579,581 B2 | 6/2003 | Bartz et al. | |
| 6,660,796 B2 | 12/2003 | Schueler et al. | |
| 6,670,004 B1 | 12/2003 | Green | |
| 6,677,015 B2 | 1/2004 | Himmelmann et al. | |
| 6,680,093 B1 | 1/2004 | Ries et al. | |
| 6,726,999 B2 | 4/2004 | Schueler et al. | |
| 6,766,091 B2 | 7/2004 | Beuth et al. | |
| 6,783,821 B2 | 8/2004 | Ries et al. | |
| 6,793,997 B2 | 9/2004 | Schmitz | |
| 6,794,048 B2 | 9/2004 | Schmitz et al. | |
| 7,025,842 B2 | 4/2006 | Monsheimer et al. | |
| 7,175,896 B2 | 2/2007 | Schmitz et al. | |
| 2001/0018105 A1 | 8/2001 | Schmitz et al. | |
| 2002/0082352 A1 | 6/2002 | Schmitz et al. | |
| 2002/0142118 A1 | 10/2002 | Schmitz et al. | |
| 2003/0072987 A1 | 4/2003 | Ries et al. | |
| 2003/0124281 A1 | 7/2003 | Ries et al. | |
| 2003/0212174 A1 | 11/2003 | Peirick et al. | |
| 2004/0071913 A1 | 4/2004 | Bellet | |
| 2004/0140668 A1 | 7/2004 | Monsheimer et al. | |
| 2004/0202908 A1 | 10/2004 | Schmitz et al. | |
| 2006/0078752 A1 | 4/2006 | Schmitz et al. | |
| 2006/0083882 A1 | 4/2006 | Schmitz et al. | |
| 2006/0099478 A1 | 5/2006 | Schmitz et al. | |
| 2006/0100323 A1 | 5/2006 | Schmidt et al. | |
| 2006/0141188 A1 | 6/2006 | Schmitz et al. | |
| 2007/0104971 A1 | 5/2007 | Wursche et al. | |
| 2007/0148388 A1 | 6/2007 | Kuhmann et al. | |
| 2007/0166560 A1 | 7/2007 | Wursche et al. | |
| 2007/0231520 A1 | 10/2007 | Dowe et al. | |

FOREIGN PATENT DOCUMENTS

| | | |
|---|---|---|
| DE | 37 15 251 A1 | 12/1988 |
| DE | 38 21 723 C1 | 9/1989 |
| DE | 40 01 126 C1 | 12/1990 |
| EP | 1 216 823 A2 | 6/2002 |
| GB | 2 204 376 | 11/1988 |
| WO | 01/64436 | 9/2001 |
| WO | WO 2006/010736 A1 | 2/2006 |

OTHER PUBLICATIONS

U.S. Appl. No. 11/685,283, filed Mar. 13, 2007, Dowe et al.
U.S. Appl. No. 10/580,194, filed May 23, 2006, Kuhmann et al.
U.S. Appl. No. 08/609,612, filed Mar. 1, 1996, Jadamus et al.
U.S. Appl. No. 10/588,487, filed Aug. 4, 2006, Schmitz et al.
U.S. Appl. No. 11/816,595, filed Aug. 17, 2007, Haeger et al.
U.S. Appl. No. 11/816,588, filed Aug. 17, 2007, Haeger et al.
U.S. Appl. No. 11/816,556, filed Aug. 17, 2007, Wursche et al.
U.S. Appl. No. 11/813,103, filed Jun. 29, 2007, Baumann et al.
U.S. Appl. No. 12/280,243, filed Aug. 21, 2008, Dowe et al.

* cited by examiner

*Primary Examiner*—Rena L Dye
*Assistant Examiner*—Walter B Aughenbaugh
(74) *Attorney, Agent, or Firm*—Oblon, Spivak, McClelland, Maier & Neustadt, P.C.

(57) ABSTRACT

A pipe includes an outer layer composed of a molding composition which includes at least 40% by weight of a polyamide whose monomer units contain an average of at least 8 carbon atoms, and a layer composed of a polypropylene molding composition. An outer diameter of the pipe is in a range from 6 to 20 mm, a wall thickness of the pipe is in a range from 1.0 to 2.0 mm, and a thickness of the polypropylene layer is from 25 to 75% of the wall thickness. The pipe can be used as an air-brake line that can be produced at low cost, has high bursting strength, and has good low-temperature impact resistance.

4 Claims, No Drawings

AIR BRAKE LINE

CROSS REFERENCE TO RELATED APPLICATIONS

This application claims priority to German Application Number DE 102006011493.0, filed Mar. 14, 2006, the disclosure of which is incorporated herein by reference in its entirety.

BACKGROUND

The invention relates to an air-brake line pipe which comprises at least one polyamide layer and at least one polypropylene layer.

Air-brake systems are often used in heavy-duty vehicles, e.g. in tractor vehicles and the like. In systems of this type, the braking system is activated via compressed air, which is passed through a pipe.

Air-brake lines are currently mainly manufactured from single-layer PA11 pipes or from single-layer PA12 pipes; there are moreover multilayer solutions in which the intention is to achieve high bursting pressure with good flexibility, by means of textile reinforcement. In regions where the level of mechanical and chemical requirements is very low, systems based on polyurethane are mainly used. Particular mention may be made here of the market for semitrailers and the market for replacement parts. These systems are less expensive than systems based on PA11 or on PA12, but have marked disadvantages in mechanical strength and in chemical resistance.

Higher polyamides, such as PA612, PA11, or PA12 are resistant to cracking, and resistant to attack by engine fuels, and by oils and water. Furthermore, they are unlike PA6 in being resistant to stress-cracking via zinc chloride. However, they are relatively expensive. Intensive work is being carried out on inexpensive alternatives, in order to comply with the price pressure present in the market.

DE-A 37 15 251 discloses a two-layer pipe which can be used as air-brake line. It is composed of a thick outer layer composed of polyamide, such as PA12, and of a thin inner layer composed of a polyolefin, such as maleic-anhydride-grafted polypropylene, which is intended to serve as barrier with respect to the alcohol present in the pressurized fluid. In a further development of this, the pipe of DE-C 38 21 723 also comprises an internal protective layer composed of a polyamide. However, pipes of this type achieve no cost advantage over single-layer polyamide pipes.

WO 01/64436 describes a multilayer pipe with an inner polyamide layer; the middle layer and the outer layer are composed of relatively precisely specified polypropylene molding compositions. That pipe is intended to be suitable for engine-fuel-line systems, pressure lines, and other lines in automobile construction. However, pipes with polypropylene outer layer are criticized inter alia on grounds of inadequate aging resistance of the polypropylene.

DE-A 101 37 863 describes another technical solution for an air-brake line; it is composed of a pipe whose layer sequence is PA11 or PA12/adhesion promoter/impact-modified PA6 or PA66; if desired, there are also the following adjoining layers: another adhesion-promoter layer, and a final layer composed of PA11 or PA12. As an alternative to this, the layer sequence of the pipe of DE-A 101 37 863 can be: PA612/impact-modified PA6 or PA66/PA612. Since the layer of PA6 or of PA66 is present with an unprotected face side, the insufficient resistance to zinc chloride in the systems has to be regarded as critical.

SUMMARY

The object of the present invention consisted in eliminating the abovementioned disadvantages and in particular providing an inexpensive pipe which complies with the requirements placed upon an air-brake line with regard to resistance to chemicals, to engine oils, to zinc chloride, and to road salt, and which has high bursting strength and good low-temperature impact resistance.

This object has been achieved with the aid of a pipe which comprises the following layers:

I. An outer layer composed of a molding composition which comprises at least 40% by weight, at least 45% by weight, at least 50% by weight, at least 55% by weight, or at least 60% by weight, of a polyamide whose monomer units contain an average of at least 8, at least 9, or at least 10 carbon atoms;

II. if desired, a layer composed of an adhesion-promoting molding composition, and III. a layer composed of a polypropylene molding composition, these layers preferably following one another in direct succession.

In one preferred embodiment, the layer of III. is followed, if desired, by another layer of II., and by another layer of I., so that not only the outer layer but also the inner layer is composed of a polyamide molding composition. In this symmetrical layer sequence, preferred layer configurations are I/III/I and I/II/III/II/I.

DETAILED DESCRIPTION OF EXEMPLARY EMBODIMENTS

The outer diameter of the pipe is in the range from 6 to 20 mm and preferably in the range from 7 to 16 mm, while the wall thickness can be from 1.0 to 2.0 mm. The thickness of the layer of III. here is from 25 to 75% of the wall thickness, preferably from 30 to 65%, and particularly preferably from 35 to 60%, while the thickness of the layer(s) of II. is in each case from 0.02 to 0.2 mm, preferably from 0.04 to 0.16 mm, and particularly preferably from 0.06 to 0.14 mm.

The polyamide of the layer of I. can be prepared from a combination of diamine and dicarboxylic acid, from an ω-aminocarboxylic acid, or from the corresponding lactam. The ω-aminocarboxylic acid or the lactam here contains at least 8, at least 9, or at least 10 carbon atoms. In the case of mixtures of lactams, the value here is the arithmetic average. In the case of a combination of diamine and dicarboxylic acid, the arithmetic average of the carbon atoms of diamine and dicarboxylic acid has to be at least 8, at least 9, or at least 10. Examples of suitable polyamides are: PA610 (which can be prepared from hexamethylenediamine [6 carbon atoms] and sebacic acid [10 carbon atoms], the average number of carbon atoms in the monomer units here therefore being 8), PA88, (which can be prepared from octamethylenediamine and 1,8-octanedioic acid), PA8 (which can be prepared from caprylolactam), PA612, PA810, PA108, PA9, PA614, PA812, PA128, PA1010, PA10, PA814, PA148, PA1012, PA11, PA1014, PA1212 and PA12. The preparation of the polyamides is prior art. It is also possible, of course, to use copolyamides based thereon, and concomitant use can, if desired, also be made of monomers such as caprolactam, with the proviso that the average of the number of carbon atoms complies with the abovementioned condition.

The polyamide can also be a polyetheresteramide or a polyetheramide. Polyetheramides are in principle known, e.g.

from DE-A 30 06 961. They contain, as comonomer, a polyetherdiamine. Suitable polyetherdiamines are obtainable via conversion of the corresponding polyetherdiols via reductive amination or coupling to acrylonitrile followed by hydrogenation (e.g. EP-A-0 434 244; EP-A-0 296 852). Their number-average molecular weight is generally from 230 to 4000; their polyetheramide content is preferably from 5 to 50% by weight.

Polyetherdiamines derived from propylene glycol are commercially available from Huntsman as JEFFAMIN® D grades. In principle, other materials with good suitability are polyetherdiamines derived from 1,4-butanediol or 1,3-butanediol, or mixed-structure polyetherdiamines, for example with random or blockwise distribution of the units deriving from the diols.

It is also possible to use mixtures of different polyamides, with the proviso that compatibility is sufficient. The person skilled in the art is aware of compatible polyamide combinations, and combinations which may be listed here by way of example are PA12/PA1012, PA12/PA1212, PA612/PA12, PA613/PA12, PA1014/PA12, and PA610/PA12. In case of doubt, routine experiments can be used to determine compatible combinations.

The polyamide preferably has an excess of amino end groups, and this generally derives from the fact that a diamine has been used as molecular weight regulator during the preparation process. The excess of amino end groups can also be established via mixing of a polyamide with low amino group content and of a polyamide with high amino group content. The ratio of amino end groups to carboxy end groups should be at least 51:49, preferably at least 55:45, particularly preferably at least 60:40, and with particular preference at least 70:30.

Alongside polyamide, other components can also be present in the molding composition of the layer of I., examples being impact modifiers, other thermoplastics, plasticizers, and other conventional additives. The only requirement is that the polyamide forms the matrix of the molding composition.

Examples of suitable impact modifiers are ethylene-α-olefin copolymers, preferably selected from (a) ethylene-$C_3$-$C_{12}$-α-olefin copolymers having from 20 to 96% by weight, preferably from 25 to 85% by weight, of ethylene. Examples of $C_3$-$C_{12}$-α-olefin used are propene, 1-butene, 1-pentene, 1-hexene, 1-octene, 1-decene, or 1-dodecene. Typical examples of these materials are ethylene-propylene rubber, and LLDPE and VLDPE.

(b) Ethylene-$C_3$-$C_{12}$-α-olefin-unconjugated diene terpolymers having from 20 to 96% by weight, preferably from 25 to 85% by weight, of ethylene, and up to at most about 10% by weight of an unconjugated diene, such as bicyclo[2.2.1]heptadiene, 1,4-hexadiene, dicyclopentadiene, or 5-ethylidenenorbornene. Another example of a suitable $C_3$-$C_{12}$-α-olefin is propene, 1-butene, 1-pentene, 1-hexene, 1-octene, 1-decene, or 1-dodecene.

The preparation of these copolymers or terpolymers is prior art, for example with the aid of a Ziegler-Natta catalyst.

Styrene-ethylene/butylene block copolymers are other suitable impact modifiers. It is preferable here to use styrene-ethylene/butylene-styrene block copolyers (SEBS) which are obtainable via hydrogenation of styrene-butadiene-styrene block copolymers. However, it is also possible to use diblock systems (SEB) or multiblock systems. These block copolymers are prior art.

These impact modifiers preferably contain anhydride groups, which are introduced in a known manner via thermal or free-radical reaction of the main-chain polymer with an unsaturated dicarboxylic anhydride, with an unsaturated dicarboxylic acid, or with an unsaturated monoalkyl dicarboxylate, at a concentration sufficient for good bonding to the polyamide. Examples of suitable reagents are maleic acid, maleic anhydride, monobutyl maleate, fumaric acid, citraconic anhydride, aconitic acid, or itaconic anhydride. It is preferable that from 0.1 to 4% by weight of an unsaturated anhydride are grafted in this way onto the impact modifier. According to the prior art, when the unsaturated dicarboxylic anhydride or its precursor is applied by grafting it can also be used together with another unsaturated monomer, such as styrene, α-methylstyrene, or indene.

Other suitable impact modifieres are copolymers which contain units of the following monomers:

a) from 20 to 94.5% by weight of one or more α-olefins having from 2 to 12 carbon atoms, b) from 5 to 79.5% by weight of one or more acrylic compounds, selected from
   acrylic acid and, respectively, methacrylic acid and, respectively, salts thereof,
   esters of acrylic acid and, respectively, methacrylic acid with a C1-C12-alcohol, these being permitted to bear a free hydroxy or epoxy function, if desired,
   acrylonitrile and, respectively, methacrylonitrile,
   acrylamides and, respectively, methacrylamides, c) from 0.5 to 50% by weight of an olefinically unsaturated epoxide, carboxylic anhydride, carboximide, oxazoline, or oxazinone.

This copolymer is composed by way of example of the following monomers, this being a non-exhaustive list:

a) α-olefins, such as ethylene, propene, 1-butene, 1-pentene, 1-hexene, 1-octene, 1-decene, or 1-dodecene;

b) acrylic acid, methacrylic acid, or salts thereof, for example with $Na^{\oplus}$ or $Zn^{2\oplus}$ as counterion; methyl acrylate, ethyl acrylate, n-propyl acrylate, n-butyl acrylate, isobutyl acrylate, n-hexyl acrylate, n-octyl acrylate, 2-ethylhexyl acrylate, isononyl acrylate, dodecyl acrylate, methyl methacrylate, ethy methacrylate, n-propyl methacrylate, n-butyl methacrylate, isobutyl methacrylate, 2-ethylhexyl methacrylate, hydroxyethyl acrylate, 4-hydroxybutyl methacrylate, glycidyl acrylate, glycidyl methacrylate, acrylonitrile, methacrylonitrile, acrylamide, N-methylacrylamide, N,N-dimethylacrylamide, N-ethylacrylamide, N-hydroxyethylacrylamide, N-propylacrylamide, N-butylacrylamide, N-(2-ethylhexyl)acrylamide, methacrylamide, N-methylmethacrylamide, N,N-dimethylmethacrylamide, N-ethylmethacrylamide, N-hydroxyethylmethacrylamide, N-propylmethacrylamide, N-butylmethacrylamide, N,N-dibutylmethacrylamide, N-(2-ethylhexyl)methacrylamide;

c) vinyloxirane, allyloxirane, glycidyl acrylate, glycidyl methacrylate, maleic anhydride, aconitic anhydride, itaconic anhydride, and also the dicarboxylic acids produced from these anhydrides via reaction with water; maleimide, N-methylmaleimide, N-ethylmaleimide, N-butylmaleimide, N-phenylmaleimide, aconitimide, N-methylaconitimide, N-phenylaconitimide, itaconimide, N-methylitaconimide, N-phenylitaconimide, N-acryloylcaprolactam, N-methacryloylcaprolactam, N-Acryloyllauroactam, N-methacryloyllauroactam, vinyloxazoline, isopropenyloxazoline, allyloxazoline, vinyloxazinone, or isopropenyloxazinone.

If glycidyl acrylate or glycidyl methacrylate is used, these also simultaneously function as acrylic compound b), and therefore if the amount of glycidyl (meth)acrylate is adequate there is no need for the presence of any other acrylic compound. In this specific embodiment, the copolymer contains units of the following monomers:

a) from 20 to 94.5% by weight of one or more α-olefins having from 2 to 12 carbon atoms,
b) from 0 to 79.5% by weight of one or more acrylic compounds, selected from
   acrylic acid and, respectively, methacrylic acid and, respectively, salts thereof,
   esters of acrylic acid and, respectively, methacrylic acid with a C1-C12-alcohol,
   acrylonitrile and, respectively, methacrylonitrile,
   acrylamides and, respectively, methacrylamides,
c) from 0.5 to 80% by weight of an acrylic or methacrylic ester which contains an epoxy group, where the entirety of b) and c) is at least 5.5% by weight.

The copolymer can contain a small amount of other copolymerized monomers, as long as these do not significantly impair the properties, examples being dimethyl maleate, dibutyl fumarate, diethyl itaconate, or styrene.

Preparation of these copolymers is prior art. A wide variety of different types of these is obtainable commercially, for example as LOTADER® (Arkema; ethylene-acrylate-tercomponent or ethylene-glycidyl methacrylate).

In one preferred embodiment, the molding composition of the layer of I. here comprises the following components:

1. from 60 to 96.5 parts by weight of the polyamide,
2. from 3 to 39.5 parts by weight of an impact-resistance component which contains anhydride groups, the impact-resistance component having been selected from ethylene-α-olefin copolymers and styrene-ethylene/butylene block copolymers,
3. from 0.5 to 20 parts by weight of a copolymer which contains units of the following monomers:
   a) from 20 to 94.5% by weight of one or more α-olefins having from 2 to 12 carbon atoms,
   b) from 5 to 79.5% by weight of one or more acrylic compounds, selected from
      acrylic acid and, respectively, methacrylic acid and, respectively, salts thereof,
      esters of acrylic acid and, respectively, methacrylic acid with a C1-C12-alcohol, these being permitted to bear a free hydroxy or epoxy function, if desired,
      acrylonitrile and, respectively, methacrylonitrile,
      acrylamides and, respectively, methacrylamides,
   c) from 0.5 to 50% by weight of an olefinically unsaturated epoxide, carboxylic anhydride, carboximide, oxazoline, or oxazinone, where the total of the parts by weight of components of 1., 2., and 3. is 100.

In another preferred embodiment, the molding composition here comprises:

1. from 65 to 90 parts by weight and particularly preferably from 70 to 85 parts by weight of the polyamide,
2. from 5 to 30 parts by weight, particularly preferably from 6 to 25 parts by weight, and with particular preference from 7 to 20 parts by weight, of the impact-resistance component,
3. from 0.6 to 15 parts by weight and particularly preferably from 0.7 to 10 parts by weight of the copolymer, which preferably contains units of the following monomers:
   (a) from 30 to 80% by weight of α-olefin(s),
   (b) from 7 to 70% by weight and particularly preferably from 10 to 60% by weight of the acrylic compound(s),
   (c) from 1 to 40% by weight and particualrly preferably from 5 to 30% by weight of the olefinically unsaturated epoxide, carboxylic anhydride, carboximide, oxazoline, or oxazinone.

Other thermoplastics which may be present in the molding composition of the layer of I. are mainly polyolefins. In one embodiment they can, as described at an earlier stage above for the impact modifiers, contain anhydride groups, and then can, if desired, be present together with an unfunctionalized impact modifier. In another embodiment, they are unfunctionalized and are present in the molding composition in combination with a functionalized impact modifier or with a functionalized polyolefin. The term "functionalized" means that the polymers of the prior art have groups which can react with the polyamide end groups, e.g. anhydride groups, carboxy groups, epoxy groups, or oxazoline groups. The following constitutions are preferred here:

1. from 50 to 95 parts by weight of the polyamide,
2. from 1 to 49 parts by weight of functionalized or unfunctionalized polyolefin, and
3. from 1 to 49 parts by weight of functionalized or unfunctionalized impact modifier, where the total of the parts by weight of components of 1., 2., and 3. is 100.

The polyolefin is polyethylene or polypropylene, for example. In principle, any commercially available type can be used. Examples of those that can be used are therefore: high-, medium- or low-density linear polyethylene, LDPE, ethylene-acrylate copolymers, ethylene-vinyl acetate copolymers, isotactic or atactic homopolypropylene, random copolymers of propene with ethene and/or 1-butene, ethylene-propylene block copolymers, and the like. The polyolefin can be prepared by any known process, for example Ziegler-Natta, the Phillips process, or by means of metallocenes, or by a free-radical route.

It is also possible that other polyamides, such as PA6, are used as other thermoplastics, their amounts being lower than those of the polyamide used according to the claims.

In one preferred embodiment, the molding composition comprises from 1 to 25% by weight of plasticizer, particularly preferably from 2 to 20% by weight, and with particular preference from 3 to 15% by weight.

Plasticizers and their use in polyamides are known. A general overview of plasticizers suitable for polyamides can be found in Gachter/Müller, Kunststoffadditive [Plastics additives], C. Hanser Verlag, 2nd Edition, p. 296.

Examples of conventional compounds suitable as plasticizers are esters of p-hydroxybenzoic acid having from 2 to 20 carbon atoms in the alcohol component, or amides of arylsulfonic acids having from 2 to 12 carbon atoms in the amine component, preferably amides of benzenesulfonic acid.

Examples of plasticizers that can be used are ethyl p-hydroxybenzoate, octyl p-hydroxybenzoate, isohexadecyl p-hydroxybenzoate, N-n-octyltoluenesulfonamide, N-n-butylbenzenesulfonamide, or N-2-ethylhexylbenzenesulfonamide.

The molding composition can moreover also comprise relatively small amounts of additives which are needed for establishing certain properties. Examples here are pigments or fillers, e.g. carbon black, titanium dioxide, zinc sulfide, silicates, or carbonates, processing aids, such as waxes, zinc stearate, or calcium stearate, flame retardants, such as magnesium hydroxide, aluminum hydroxide, or melamine cyanurate, glass fibers, antioxidants, UV stabilizers, and also additions giving antielectrostatic properties or electrical conductivity to the product, e.g. carbon fibers, graphite fibrills, fibers composed of stainless steel, and, respectively, conductive carbon black.

In the case of a symmetrical layer sequence, in which two layers of I. are present, the respective molding compositions can differ in the nature of the polyamide and also in the nature and amount of the other components. However, it is preferable that the two molding compositions are identical, because then the two layers can be fed from a single extruder.

In order to ensure that the line has the flexibility desired for its performance, the tensile modulus of elasticity of the polyamide molding composition to ISO 527, i.e. of the molding composition that forms the layer(s) of I., is preferably from 300 to 800 MPa and particularly preferably from 400 to 600 MPa.

The nature of the adhesion promoter of the layer of II. is not critical. It is possible to use any of the adhesion promoters which give sufficiently secure mutual bonding of the layers of I. and III., so that they do not delaminate either during production or during subsequent use. In the simplest case, the adhesion promoter is a polypropylene which contains anhydride groups, which are introduced in known manner via thermal or free-radical reaction of the polypropylene with an unsaturated dicarboxylic anhydride, with an unsaturated dicarboxylic acid, or with an unsaturated monoalkyl dicarboxylate, at a concentration sufficient for good bonding to the polyamide of the adjacent layer. Examples of suitable reagents are maleic acid, maleic anhydride, monobutyl maleate, fumaric acid, aconitic acid, or itaconic anhydride. It is preferable that from 0.1 to 4% by weight of an unsaturated anhydride are grafted in this way onto the polypropylene. According to the prior art, when the unsaturated dicarboxylic anhydride or its precursor is applied by grafting it can also be used together with another unsaturated monomer, such as styrene, α-methylstyrene, or indene. However, the adhesion promoter can also be a blend composed of a polypropylene of this type bearing anhydride groups and of a polyamide. The adhesion promoter can moreover also comprise unfunctionalized polypropylene. Other suitable adhesion promoters are composed of polyamide, of functionalized ethylene-propylene rubber, and of unfunctionalized polypropylene. The adhesion promoters disclosed in EP-A 1 216 823 are also suitable. If the adhesion promoter comprises a polyamide, the polyamide to be selected here is either identical with that in the layer of I. or is a polyamide sufficiently compatible therewith, in order to adhere thereto.

The polypropylene molding composition of the layer of III. can in principle comprise any of the commercially available types of polypropylene, for example isotactic or syndiotactic homopolypropylene, a random copolymer of propene with ethene and/or 1-butene, an ethylene-propylene block copolymer, or the like. The polypropylene can be prepared by any known process, for example Ziegler-Natta, or by means of metallocene catalysis. It can comprise an impact-resistance component, e.g. EPM rubber or EPDM rubber, or SEBS. The conventional auxiliaries and additives can moreover also be present, examples being pigments or fillers, e.g. carbon black, titanium dioxide, zinc sulfate, silicates, or carbonates, stabilizers, or processing aids, e.g. waxes, zinc stearate, or calcium stearate. Examples of conventional polypropylene contents in the molding composition are at least 50% by weight, at least 60% by weight, at least 70% by weight, at least 80% by weight, or at least 90% by weight.

In one possible embodiment, the polypropylene used in the innermost layer has a melt flow rate (MFR) to ISO 1133 (230° C./2.16 kg) in the range form 0.1 to 3 g/10 min, particularly preferably in the range from 0.15 to 2 g/10 min, with particular preference in the range from 0.18 to 1.5 g/10 min, and very particularly preferably in the range from 0.2 to 1 g/10 min.

The polypropylene of the layer of III. is preferably what is known as a propene-ethene block copolymer, also often termed a heterophasic copolymer. These heterophasic copolymers can by way of example be prepared in a two-phase process which proceeds approximately as follows: first, a highly isotactic polypropylene is prepared using, for example, a Ziegler-Natta catalyst, a small amount of ethene sometimes being permitted to be present here, giving a random polymer. This material functions as matrix of a heterophasic copolymer. In a second step of the reaction (if desired in another reactor) a second catalyst is introduced if desired, e.g. a metallocene catalyst. Copolymerization of ethene with propene then takes place, this polymerization reaction proceeding in cavities of the first polymer. The result is that the second polymer becomes embedded there.

In one preferred embodiment, the block copolymer or heterophasic copolymer contains at least 0.5% by weight, at least 0.6% by weight, at least 0.7% by weight, at least 0.8% by weight, or at least 0.9% by weight, and also at most 20% by weight, at most 15% by weight, at most 12% by weight, at most 10% by weight, or at most 8% by weight, of copolymerized ethene. Up to 15% by weight of 1-butene can moreover also have been copolymerized.

The polypropylene of the layer of III. may have been functionalized, for example with anhydride groups, in the manner described at an earlier stage above for the polypropylene of the layer of II. This can achieve direct adhesion to the layer of I., thus making it unnecessary to use an adhesion-promoter layer of II. in this instance.

In this instance, it is, of course, also possible to use a mixture composed of an unfunctionalized and of a functionalized polypropylene, for example in a ratio by weight of from 95:5 to 1:99, preferred ratios by weight being from 75:25 to 25:75, and particularly preferred ratios by weight being from 60:40 to 40:60.

If the bursting strength requirements are relatively high, the pipe can also comprise textile reinforcement of the prior art. This can be present either within one layer or between two layers. The easiest industrial manufacturing process applies the textile layer to the outer layer of the pipe with subsequent rubber coating. The rubber that can be used here is either a vulcanizable rubber or a thermoplastic elastomer, such as Santopren. Coating with rubber can also take place without application of a textile layer.

The inventive pipe is used as air-brake line, for example in trucks, in semitrailers, in truck trailers, or in trailer units. The pressure used to operate the lines in trucks is generally up to 12.5 bar, or 8.5 bar in semitrailers and in trailer units.

The invention is illustrated by examples below.

The following molding compositions were used in the examples:

PA: VESTAMID® X7297, an impact-modified, plasticized PA12 whose amino end group content is 40 mmol/kg, and whose carboxy end group content is 12 mmol kg, and whose tensile modulus of elasticity is 400 MPa.

AP: ADMER® QB520E, a maleic-anhydride-functionalized polypropylene

PP1: VESTAMID® PP SX8100, a stabilized heterophasic copolymer based on propene whose ethylene content is 2.4% by weight (determined by way of $^{13}$C NMR) and whose MFR 230/2.16 to ISO 1133 is 0.4 cm$^3$/10 min.

PP2: a mixture composed of 50% by weight of VESTAMID® SX8100 and 50% by weight of ADMER® QB520E.

Multilayer pipes corresponding to examples 1-10 with external diameter of 8 mm and wall thickness of 1 mm were produced on a multilayer extrusion plant and were then tested. The details are collated in table 1. It is seen that even when polypropylene content is considerable, requirements with respect to mechanical data and in particular with respect to bursting strength are met.

TABLE

Pipe structures and test results

|  | Example |  |  |  |  |
|---|---|---|---|---|---|
|  | 1 | 2 | 3 | 4 | 5 |
| 1st layer (outer layer) | 0.1 mm PA | 0.15 mm PA | 0.2 mm PA | 0.25 mm PA | 0.2 mm PA |
| 2nd layer | 0.1 mm AP | 0.1 mm AP | 0.1 mm AP | 0.1 mm AP | 0.1 mm AP |
| 3rd layer | 0.6 mm PP1 | 0.5 mm PP1 | 0.4 mm PP1 | 0.3 mm PP1 | 0.7 mm PP1 |
| 4th layer | 0.1 mm AP | 0.1 mm AP | 0.1 mm AP | 0.1 mm AP |  |
| 5th layer | 0.1 mm PA | 0.15 mm PA | 0.2 mm PA | 0.25 mm PA |  |
| Low-temperature impact resistance [fracture rate] |  |  |  |  |  |
| to DIN 73378 6.4.6, −40° C., fresh from extrusion | 1/10 | 0/10 | 0/10 | 0/10 | 0/10 |
| to SAE J2260 7.6, −40° C., fresh from extrusion | 2/10 | 0/10 | 0/10 | 1/10 | 0/10 |
| to SAE J844, −40° C. fresh from extrusion | 1/10 | 0/10 | 0/10 | 0/10 | 2/10 |
| Tensile test to ISO 527 |  |  |  |  |  |
| tensile strength [N/mm$^2$] | 23.7 | 24.6 | 25.2 | 26.5 | 22.6 |
| tensile strain at break [%] | 253 | 263 | 237 | 231 | 237 |
| tensile modulus of elasticity [N/mm$^2$] | 741 | 695 | 622 | 554 | 742 |
| Bursting pressure to SAE J844 at 10 bar/s [bar] |  |  |  |  |  |
| at 23° C. | 63.3 | 60.5 |  | 58.8 | 62.4 |
| at 100° C. |  | 20.0 |  |  |  |
| Hoop stress to SAE J844 [MPa] |  |  |  |  |  |
| at 23° C. | 23.5 | 22.8 |  | 23.6 | 23.4 |
| at 100° C. |  | 7.6 |  |  |  |
| Minimum bending radius to SAE J844 [mm] | 40 | 37 | 40 | 37 | 38 |
| Fracture properties to GME 08100 7.7 |  |  |  |  |  |
| maximum bending force | 74.5 | 74.8 | 71.2 | 62.7 | 74.9 |
| deflection at maximum bending force | 4.9 | 5.0 | 5.6 | 6.1 | 4.6 |
| bending force for 3.5 mm deflection | 72.2 | 72.3 | 67.4 | 58.6 | 73.3 |

|  | Example |  |  |  |  |
|---|---|---|---|---|---|
|  | 6 | 7 | 8 | 9 | 10 |
| 1st layer (outer layer) | 0.3 mm PA | 0.4 mm PA | 0.5 mm PA | 0.5 mm PA | 0.25 mm PA |
| 2nd layer | 0.1 mm AP | 0.1 mm AP | 0.1 mm AP | 0.5 mm PP2 | 0.5 mm PP2 |
| 3rd layer | 0.6 mm PP1 | 0.5 mm PP1 | 0.4 mm PP1 |  | 0.25 mm PA |
| 4th layer |  |  |  |  |  |
| 5th layer |  |  |  |  |  |
| Low-temperature impact resistance [fracture rate] |  |  |  |  |  |
| to DIN 73378 6.4.6, −40° C., fresh from extrusion | 0/10 | 0/10 | 0/10 | 0/10 | 0/10 |
| to SAE J2260 7.6, −40° C., fresh from extrusion | 0/10 | 0/10 | 0/10 | 0/10 | 0/10 |
| to SAE J844, −40° C. fresh from extrusion | 1/10 | 0/10 | 0/10 | 0/10 | 0/10 |
| Tensile test to ISO 527 |  |  |  |  |  |
| tensile strength [N/mm$^2$] | 23.3 | 24.0 | 26.2 | 25.0 | 26.0 |
| tensile strain at break [%] | 205 | 225 | 195 | 198 | 215 |
| tensile modulus of elasticity [N/mm$^2$] | 693 | 593 | 589 | 580 | 612 |

TABLE-continued

Pipe structures and test results

| | | | | | |
|---|---|---|---|---|---|
| Bursting pressure to SAE J844 at 10 bar/s [bar] | | | | | |
| at 23° C. | | 58.1 | 63.3 | 60.8 | 61.3 |
| at 100° C. | | 22.0 | | | |
| Hoop stress to SAE J844 [MPa] | | | | | |
| at 23° C. | | 23.1 | 24.2 | 22.1 | 21.7 |
| at 100° C. | | 8.7 | | | |
| Minimum bending radius to SAE J844 [mm] | 40 | 40 | 37 | 39 | 37 |
| Fracture properties to GME 08100 7.7 | | | | | |
| maximum bending force | 78.5 | 66.9 | 73.3 | 68.3 | 71.2 |
| deflection at maximum bending force | 4.9 | 5.0 | 5.4 | 5.1 | 5.0 |
| bending force for 3.5 mm deflection | 76.2 | 64.8 | 69.6 | 66.8 | 68.7 |

In the above detailed description, reference was made by way of non-limiting example to preferred embodiments of the invention. Obviously, numerous modifications and variations of the present invention are possible in light of the above teachings. It is therefore to be understood that within the scope of the appended claims, the invention may be practiced otherwise than as specifically described herein.

The invention claimed is:

1. An air-brake line, comprising:
a first layer comprising a polyamide molding composition comprising at least 40% by weight of a polyamide having monomer units including an average of at least 8 carbon atoms;
a second layer formed on the first layer, the second layer comprising an adhesion-promoting molding composition;
a third layer formed on the second layer so that the second layer is interposed between the first layer and the third layer, the third layer comprising a polypropylene molding composition;
a fourth layer formed on the third layer, the fourth layer comprising an adhesion-promoting molding composition; and
a fifth layer formed on the fourth layer so that the fourth layer is interposed between the third layer and the fifth layer, the fifth layer comprising a polyamide molding composition comprising at least 40% by weight of a polyamide having monomer units including an average of at least 8 carbon atoms;
wherein:
an outer diameter of the pipe is in a range from 6 to 20 mm;
a wall thickness of the pipe is in a range from 1.0 to 2.0 mm;
a thickness of the second layer is in a range of from 0.02 to 0.2 mm;
a thickness of the third layer is from 25 to 75% of the wall thickness; and
the polypropylene molding composition comprises a polypropylene having a melt flow rate (MFR) measured by ISO 1133 (230° C./2.16 kg) in a range of from 0.1 to 3 g/10 mm.

2. The air-brake line according to claim 1, wherein:
the polyamide molding composition that forms the first layer further comprises at least one component selected from the group consisting of: impact modifiers, other thermoplastics, plasticizers, pigments, fillers, processing aids, flame retardants, glass fibers, antioxidants, UV stabilizers, and additives giving electrical conductivity or antielectrostatic properties to the layer (I); and
the polyamide forms a matrix of the polyamide molding composition of the first layer.

3. The air-brake line according to claim 1, wherein the polyamide molding composition of the first layer comprises:
from 50 to 95 parts by weight of polyamide based on 100 parts by weight of the composition;
from 1 to 49 parts by weight of functionalized or unfunctionalized polyolefin based on 100 parts by weight of the composition; and
from 1 to 49 parts by weight of functionalized or unfunctionalized impact modifier based on 100 parts by weight of the composition.

4. The air-brake line according to claim 1, wherein a modulus of elasticity of the polyamide molding composition of the first layer is from 300 to 800 MPa.

* * * * *